Nov. 1, 1955        A. F. ERICKSON        2,722,103

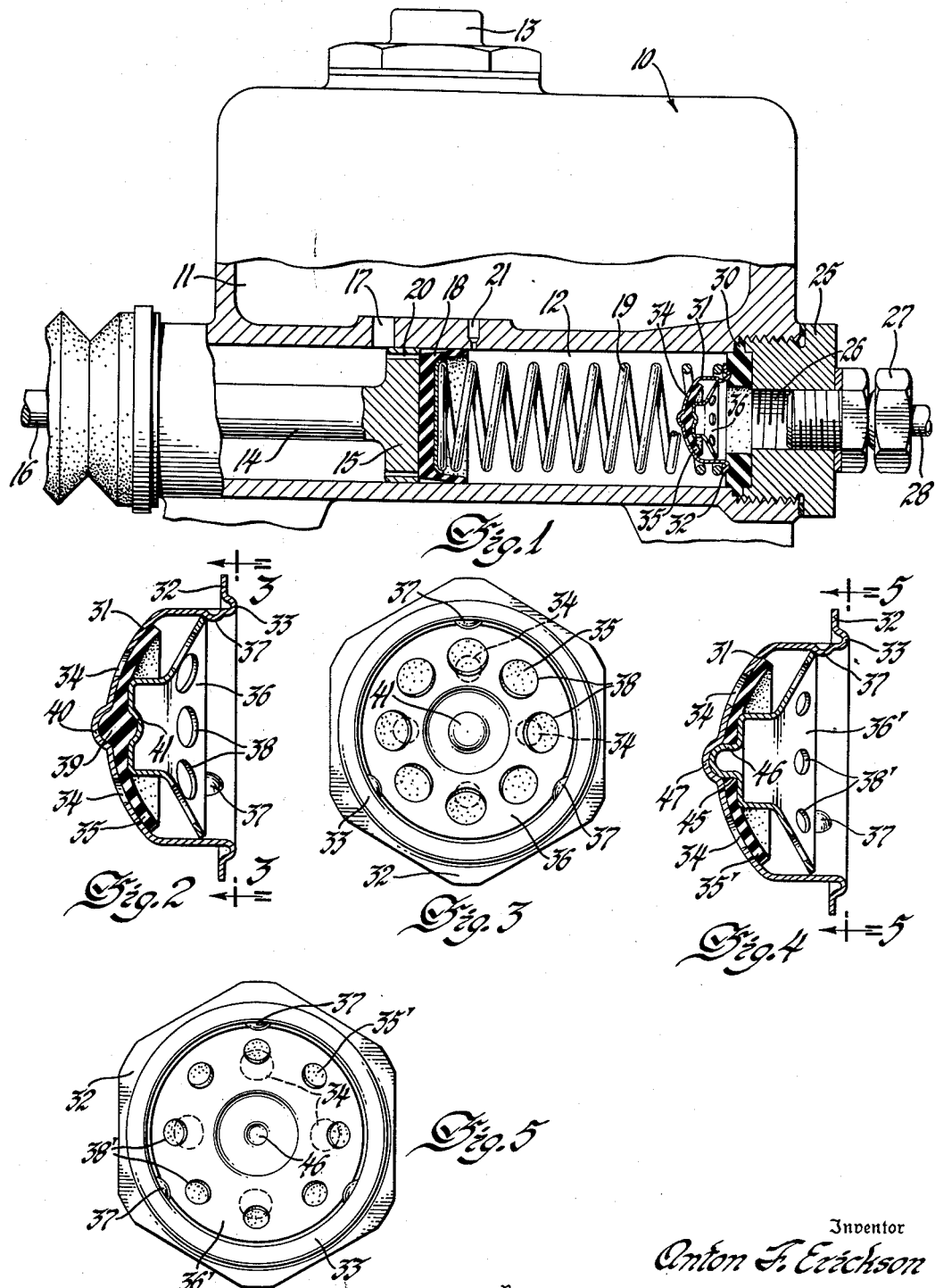

OUTLET VALVE FOR MASTER CYLINDER

Filed May 28, 1948        2 Sheets-Sheet 2

Inventor
Anton F. Erickson

By Spencer, Willets, Helmig & Baillio
Attorneys

United States Patent Office 2,722,103
Patented Nov. 1, 1955

2,722,103

OUTLET VALVE FOR MASTER CYLINDER

Anton F. Erickson, Dayton, Ohio, assignor to General Motors Corporation, Detroit, Mich., a corporation of Delaware Application May 28, 1948, Serial No. 29,900

28 Claims. (Cl. 60—54.6)

This invention relates to an improved hydraulic brake master cylinder, and more particularly, the invention is concerned with an improvement in the valve at the outlet end of the master cylinder.

An object of the invention is to provide an improved master cylinder construction which will prevent the rubber valve parts or seals or any portion thereof, which may become free due to the deterioration of the rubber, from entering and clogging the outlet passage to the wheel cylinders.

Other objects and advantages will be apparent from the following description.

In the drawings:

Figure 1 is a side elevation view partly in section of a master cylinder of a hydraulic brake system.

Figure 2 is a cross sectional view of a valve at the outlet of the master cylinder.

Figure 3 is an end view as seen from the line 3—3 of Figure 2.

Figure 4 is a cross sectional view of a modified valve.

Figure 5 is an end view as seen from the line 5—5 of Figure 4.

Figure 6:
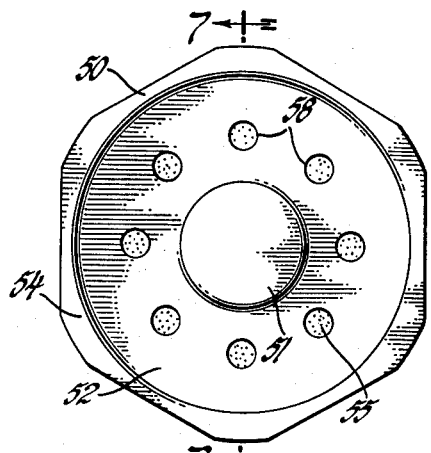
Figure 6 is an end view of another modified valve.

Referring to the drawing, the master cylinder and reservoir unit or body 10 comprises a reservoir 11 overlying the cylinder or bore 12. The reservoir has a conventional filler and breather cap 13. Slidable within the cylinder 12 is a piston 14 preferably of double-headed form. One head is shown at 15. The piston is advanced by a piston rod 16 connected to the usual brake pedal. The piston 14 as shown in Figure 1 is in its fully retracted position and indicates the location of the passage 17 between the reservoir and the cylinder, which keeps the space on the low pressure side of piston head 15 filled with fluid. A rubber cup seal 18 is positioned on the high pressure side of the piston and is held in contact with the piston head by the coil spring 19. During the retrograde movement of the piston fluid will flow through the passages 20 in the piston head and around the flexible seal to replace any fluid loss in the system. The bleed passage 21 provides communication between the reservoir and the cylinder when the piston is in its fully retracted position.

A plug 25 is threaded into the discharge end of the cylinder to provide an annular end wall and has a central opening 26 in which is suitably secured by a fitting 27 the conduit 28, to provide an outlet passage for carrying the fluid to the wheel cylinders, not shown. Clamped between a shoulder in the cylinder and the plug is a rubber ring 30 which forms an annular seat for the valve 31. The valve or valve frame 31 is of dome shape and has an annular flange 32 preferably with a circular rib 33, which provides a seal when it seats on the rubber ring 30. The valve is held in seated position on the rubber ring by the spring 19 which engages the flange 32 and the cup 18. When the pressure within the conduit 28 exceeds the pressure of spring 19 the valve may lift and allow fluid flow back to the master cylinder 12.

To permit fluid to flow from the master cylinder to the conduit and the wheel cylinder a second valve is located on the valve 31. A series of holes 34 are formed in the dome portion of valve 31 and preferably distributed in a circular series. A normally flat rubber disc 35 of circular shape is pressed into the dome portion of valve 31 and covers the holes 34. The rubber disc 35 is clamped between the valve 31 and a cage 36. The cage is shaped to provide a central cup-shaped portion and a laterally extending flange. The cage is preferably secured within the valve 31 by detents 37 pressed in the wall of valve 31. Passages or apertures 38 preferably having a smaller diameter than the smallest part of the outlet passage conduit and arranged in a circular series are provided in the cage to allow fluid passage through the cage. The diameter of the cage is larger than the bore 26 of the outlet passage to prevent, if it should become loose, its entrance into and clogging of or sticking in the outlet passage.

The disc 35 is positioned against lateral displacement by the centrally located enlargement 39 which fits in two complementary depressions 40 and 41 respectively in the valve and cage.

The modified valve shown in Figures 4 and 5 consists of a similar valve 31 and cage 36' clamping a rubber disc 35'. This rubber disc is secured against lateral displacement by a central aperture 45 in the disc which fits over an integral trunnion 46 formed in the base of the cage. In order to locate the cage and positively secure the disc the trunnion fits into a depression 47 in the valve.

This construction provides a simple three-part valve wherein the rubber valve disc is confined between the valve and the cage. Thus, even though the rubber valve disc should deteriorate and tear, it cannot be forced through the small passages 38' into the outlet passage and clog the brake conduit 28. It also will be noticed that the valve seat or rib 33 is located near the inner edge of the rubber seat ring 30. Due to the fact that the ring is clamped between the cylinder wall shoulder and the plug there is a tendency when the rubber ring deteriorates for the ring to be pushed radially outward rather than to chip pieces off that would clog the outlet conduit.

Figure 7:
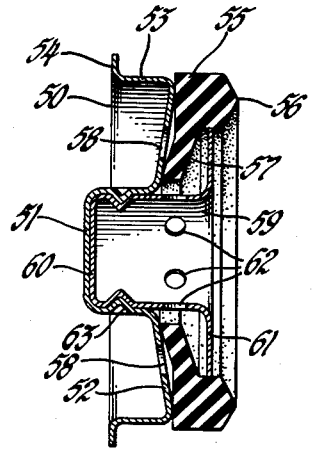
Figure 7 is a cross sectional view on the line 7—7 of Figure 6.
Figure 8:
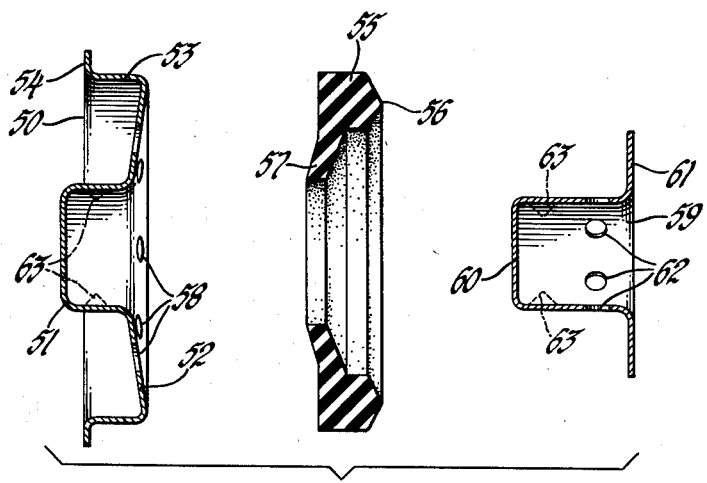
Figure 8 is an exploded view showing the parts of this other modified valve before assembly.

The valve modification shown in Figures 6, 7 and 8 is employed as shown in Figure 1. However, in view of the fact that this valve has a rubber seat, the rubber ring 30 may be omitted. As shown in Figure 7 this valve has a frame 50 which consists of a central cup portion 51, a laterally directed flange portion 52, an axially reinforcing flange 53 and a laterally directed guide flange 54. The rubber annulus 55 has a valve seat rib 56 and a laterally inwardly directed flap 57. This flap extends inward sufficiently to cover the holes 58 preferably arranged in a circular series in the lateral flange 52. The annulus is secured in position by a cage 59 which has a cup portion 60 fitting into the cup portion 51 of the valve frame and a laterally directed flange 61 extending outwardly to the inside of the rubber annulus 55. The side wall of the cage cup portion 60 has passages 62, preferably arranged in a circular series, to provide for fluid flow through the cage. This valve is positioned in the master cylinder in the same manner as the other valves. The seat ring 30 is preferably omitted and the seat rib 56 directly engages the cylinder end wall or plug 25. The spring 19 engages the flange 52 and holds the valve in position but permits the valve to move from its seat for the return flow of fluid when the fluid pressure in conduit 28 exceeds the spring pressure. The fluid flows to the brakes through holes 58 by displacing the flap 57 and passing through the passages 62 in the cage.

The parts—the frame 50, the annulus 55 and the cage 59—are assembled as shown in Figure 8 and put together. Then the frame and cage are secured together preferably by a stamped depression 63.

It will be noted that the cage 59 holds the annulus 55 and the flap 57 in position so that the fluid pressure may close the valve, and that the cage flange 61 has the same diameter as the inner diameter of the annulus 55 to prevent lateral movement thereof. The flange 61 has a diameter as large as or slightly larger than the outlet passage or opening 26, and the passages 62 are smaller than the smallest part of the outlet opening 26. Thus, if the rubber deteriorates the flap 57 which receives the most flexing movement, and thus would break or tear first, is confined between the frame, cage and annulus, and thus cannot clog the outlet conduit 28. If the annulus should deteriorate, it will be compressed and the flange 61 will prevent the annulus or a part thereof from clogging the outlet conduit.

These specific forms of the valve are illustrative of the invention. It will be apparent that modifications may be made by those skilled in the art within the terms of the appended claims.

I claim:

1. In a valve assembly, a valve body having a bore, said body having an end wall closing said bore, said end wall having an annular seat and a central opening, a central outlet passage including said central opening in said end wall and an outlet conduit connected to said central opening, a valve in said bore having an annular edge adapted to engage said annular seat, an abutment in said bore spaced from said valve, a spring engaging said valve and said abutment to normally maintain said valve in contact with said annular seat, said valve comprising a frame, a cage and a movable member, said frame having a hole, a cage secured to said valve frame and having a diameter larger than said outlet opening to prevent said cage element entering said outlet passage under all conditions of failure when said cage may become disengaged from said frame, a plurality of small apertures in said cage, said movable member being secured between said frame and cage and biased to cover said hole in the frame, and said frame and cage acting to limit and confine said movable member against displacement into the outlet opening and toward the other end of said bore.

2. The invention defined in claim 1, said apertures in the cage being smaller than the said central outlet passage to prevent the passage of solid particles that would clog the outlet passage.

3. In a valve mechanism, a body having a bore, a valve seat having an outlet opening in said bore, a check valve having a cup-shaped frame, a plurally apertured cage element and a movable valve member, said cup-shaped frame including a base having a plurality of holes therein, a sealing edge located adjacent the edge of the cup-shaped frame opposite from said base and adapted to engage said seat, said cage element being located entirely within and secured to the inner wall of said cup-shaped frame member, said movable valve member being secured between said frame base and said cage element and normally biased to a position engaging said frame and covering said frame holes to prevent flow from said outlet opening and said cage aperture through said frame holes, said valve member being movable from said position to a valve open position to permit flow through said frame holes, said cage apertures and said outlet opening during normal operation, and said frame and cage element limiting and confining the movement of said movable valve member.

4. In a valve mechanism, a body having a bore, a valve seat having an outlet opening in said bore, an outlet passage including said outlet opening and an outlet conduit connected to said outlet opening, a check valve having a cup-shaped frame, an apertured cage element and a movable valve member, said cup-shaped frame including a base having a plurality of holes therein, a sealing edge located adjacent the edge of the cup-shaped frame opposite from said base and adapted to engage said seat, said cage element being located within and secured to said cup-shaped frame member, said movable valve member being positioned between said frame and said cage element and normally biased to a position engaging said frame and covering said frame holes to prevent flow from said outlet passage and said cage aperture through said frame holes, said valve member being movable from said position to a valve open position to permit flow through said frame holes, said cage apertures and said outlet passage during normal operation, and said cage element having a transverse dimension larger than the diameter of said outlet opening to prevent said cage element entering said outlet opening under all conditions of failure when said cage may become disengaged from said frame and tend to enter and plug said outlet opening.

5. In a valve mechanism, a body having a bore, a valve seat having an outlet opening in said bore, an outlet passage including said outlet opening and an outlet conduit connected to said outlet opening, a check valve having a cup-shaped frame, an apertured cage element and a movable valve member, said cup-shaped frame including a base having a plurality of holes therein, a sealing edge located adjacent the edge of the cup-shaped frame opposite from said base and adapted to engage said seat, said cage element being located within and secured to said cup-shaped frame member, said movable valve member being positioned between said frame and said cage element and normally biased to a position engaging said frame and covering said frame holes to prevent flow from said outlet passage and said cage aperture through said frame holes, said valve member being movable from said position to a valve open position to permit flow through said frame holes, said cage apertures and said outlet passage during normal operation, and said cage apertures being smaller than said outlet passage to prevent portions of said movable valve member under conditions of failure by disintegration from passing through said cage apertures and readily clogging said outlet passage.

6. In a valve mechanism as defined in claim 5, and said cage element having a transverse dimension larger than the diameter of said outlet opening to prevent said cage element entering said outlet opening under all conditions of failure when said cage may become disengaged from said frame and tend to enter and plug said outlet opening.

7. A master cylinder having a piston therein, a cylinder end wall providing an annular wall and a central outlet opening, a valve in said cylinder, a spring engaging said valve and said piston to normally maintain said valve in contact with said annular wall, said valve comprising a frame having a hole, seat means on said frame engaging said annular wall, a cage secured within said valve frame and having a diameter larger than said outlet opening, a plurality of small apertures in said cage, a resilient valve flap secured between said frame and cage and covering said hole in the frame whereby said resilient valve flap is confined against displacement into the outlet opening.

8. The invention defined in claim 7, said apertures in the cage being smaller than the outlet opening to prevent the passage of solid particles that would clog the outlet passage.

9. A master cylinder, a cylinder end wall having a central outlet opening and providing an annular wall, a valve in said cylinder normally maintained in closed position in contact with said annular wall, said valve comprising a frame having a substantially cylindrical wall portion, a hole in said frame, seat means operatively connected to said frame and normally engaging said annular wall, a cage positioned within said frame, a portion of said cage engaging said cylindrical wall portion of the frame, a depression formed in the cylindrical wall of the frame and engaging said cage to secure the cage in position, a rubber valve flap secured between said frame and cage and having a portion covering said hole in the frame, said valve cage having a diameter larger than said outlet opening and having a plurality of small openings to allow fluid flow therethrough but to prevent the passage of displaced rubber parts to the outlet opening.

10. The invention defined in claim 9, said openings in said cage being smaller than the outlet passage to prevent the passage of solid particles of a size that would clog the outlet passage.

11. The invention defined in claim 9, said rubber valve flap having a central enlargement, said valve frame and cage having complementary depressions fitting said enlargement to clamp said valve flap in position.

12. The invention defined in claim 9, said rubber valve flap having an aperture, said valve frame having a central depression, said cage having a central trunnion extending through said aperture and into said depression to secure said valve flap in position.

13. The invention defined in claim 9, said seat means comprising an annular rubber ring, said valve flap being attached to said ring and extending inward therefrom, said valve cage having an outwardly extending flange abutting said ring, said flap being positioned between said valve frame and said flange of the cage to secure the valve flap in position.

14. A master cylinder having a piston therein, a shoulder adjacent one end of said cylinder, a closure plug having an outlet opening secured in said cylinder, a rubber seat ring clamped between said shoulder and said plug, a valve seating in said cylinder, a spring engaging said valve and said piston to normally maintain said valve in contact with said seat ring, said valve comprising a frame, a seat rib on said frame engaging said ring adjacent the inner edge thereof, a hole in said frame, a rubber valve flap with a portion covering said hole, a cage positioned within said frame and secured thereto, a portion of said cage and said frame clamping said valve flap to secure it in position, a plurality of apertures, smaller than said outlet opening in said valve cage to provide for fluid flow and prevent passage of deteriorated parts of said flap which may clog the outlet opening.

15. A master cylinder outlet valve for a passage comprising a cup shaped frame having base and side wall portions, a seat rib operatively attached to said frame, said frame having a hole, a rubber valve flap having a portion covering said hole and resiliently engaging said frame around said hole, said rubber valve flap having a second portion engaging and permanently fixed to said frame, a valve cage positioned within said frame and having a portion permanently securing and clamping said valve flap to said frame, said cage being secured to said side wall portion of said frame, a plurality of small openings in said cage providing fluid flow therethrough and preventing passage of foreign matter which would clog the passage.

16. A master cylinder outlet valve comprising a cup shaped frame having base and side wall portions, a seat rib operatively attached to said side wall portion, the central part of said base portion providing an attaching abutment, a series of holes in said base portion spaced around said central part, a resilient valve flap having a portion covering said holes and resiliently engaging said frame around said holes, said valve flap having a second portion permanently engaging and fixed to said frame at said control part, a valve cage secured to said frame, said valve cage having an abutment portion engaging said valve flap over said central part of said frame to permanently secure and clamp said valve flap to said frame, the other portion of said valve cage being spaced from said valve flap and in conjunction with said valve frame forming an enclosure for said valve flap, said cage being secured to said side wall portion of said frame, a plurality of small openings in said cage providing fluid flow therethrough and preventing passage of foreign matter which would clog said outlet passage.

17. The invention defined in claim 15, said valve flap having an enlargement, complementary depressions in said valve frame and said portion of the valve cage surrounding said enlargement and securing said valve flap in position.

18. The invention defined in claim 15, said valve flap having an aperture therein, a depression in said valve frame, a trunnion on said valve cage extending through said aperture and extending into said depression to position and secure said valve flap.

19. The invention defined in claim 15, said seat rib comprising a ring, said valve flap being connected to said ring and extending inwardly therefrom, said valve cage having an outwardly extending flange, said flap being positioned between said frame and said flange to hold it in operative position.

20. A master cylinder unit comprising a casing portion having an end wall forming an annular seat with a central outlet passage therein, a valve frame having seat means engaging said annular seat, spring means engaging said frame to normally hold the frame in contact with said annular seat, a hole in said frame, a rubber valve flap having a portion covering said hole, a cage positioned within and secured to said frame, a portion of said cage and frame holding said flap in position, a plurality of apertures smaller than said outlet passage in said cage to allow fluid flow therethrough but to prevent the passage of particles that would clog the outlet passage.

21. The invention defined in claim 20, said cage having a part of larger dimension than the dimension of said outlet passage to prevent the cage entering and sticking in the outlet passage.

22. A master cylinder unit comprising a casing portion having an end wall, a central outlet passage in said end wall, a valve frame having seat means engaging said end wall, spring means engaging said frame to normally hold said seat against said end wall, a hole in said frame, a rubber valve flap having a portion covering said hole, a cage positioned within and secured to said frame, a portion of said cage and frame holding said flap in position, a plurality of apertures in said cage, said cage having a transverse dimension greater than the corresponding transverse dimension of the outlet passage to prevent the entrance and sticking of the cage in the outlet opening.

23. A master cylinder valve comprising a frame, a valve seat connected to said frame, a hole in said frame, a rubber valve flap having a portion covering said hole, a valve cage positioned within said frame, a detent depression pressed in said frame and securing said cage in position, a portion of said cage and frame engaging said flap to secure the flap in operative position.

24. A master cylinder valve comprising a frame having a cylindrical wall portion, a valve seat connected to said frame, a hole in said frame, a rubber valve flap having a portion covering said hole, a valve cage positioned within said frame, a detent depression pressed in said cylindrical wall portion and securing said cage in position, a portion of said cage and frame engaging said flap to secure the flap in operative position.

25. A master cylinder valve comprising a frame, a valve seat on said frame, a hole in said frame, a rubber valve flap having a portion covering said hole, a valve cage secured within said frame, a portion of said cage and frame permanently securing said flap in fixed position on said frame, a plurality of small apertures in said cage to allow fluid therethrough but to prevent the passage of solid particles which may break away from said valve flap.

26. In a two-way check valve, a valve body, a bore in said valve body, a closure for said bore providing a shoulder in said bore, an outlet passage in said closure, a valve positioned in said bore, said valve having a frame having a peripheral seat sealingly engaging said shoulder, a spring engaging said valve and resiliently holding said seat in contact with said shoulder, a hole in said valve frame, a resilient valve flap contacting said frame and covering said hole, a cage secured to said frame and surrounding said valve flap, said cage having an abutment portion engaging and clamping said valve flap to said valve frame, the other portion of said cage being spaced from said valve flap, said cage having portions of larger diameter than said outlet passage to prevent said cage entering said outlet passage and said cage having a plurality of openings smaller than said outlet passage to prevent passage of large particles of foreign matter that would clog said outlet passage.

27. The invention defined in claim 15, said side wall portion of said cup-shaped frame having an outwardly extending part, said seat rib being a resilient sealing ring engaging said outwardly extending part, said hole in said frame being located in said outwardly extending part within said sealing ring, said rubber valve flap being secured to said sealing ring, said valve cage extending outwardly to said sealing ring, and said valve flap being positioned between said frame and valve cage to hold said valve flap and sealing ring in position.

28. The invention defined in claim 23, said valve seat being a rubber ring, and said rubber valve flap being secured to said ring and holding said ring in operative position.

References Cited in the file of this patent
UNITED STATES PATENTS

| | | |
|---|---|---|
| 1,692,265 | Blom | Nov. 20, 1928 |
| 1,751,982 | Dunham | Mar. 25, 1930 |
| 1,885,121 | Loweke | Nov. 1, 1932 |
| 1,985,936 | Loweke | Jan. 1, 1935 |
| 2,027,137 | Yeomans | Jan. 7, 1936 |
| 2,038,267 | Bullard | Apr. 21, 1936 |
| 2,113,615 | Farmer | Apr. 12, 1938 |
| 2,128,050 | Landis | Aug. 23, 1938 |
| 2,174,503 | Whipple | Sept. 26, 1939 |
| 2,179,201 | Scott | Nov. 7, 1939 |
| 2,202,123 | Strode | May 28, 1940 |
| 2,236,320 | Mosel | Mar. 25, 1941 |
| 2,245,991 | Loweke | June 17, 1941 |